(12) United States Patent
Dennison et al.

(10) Patent No.: US 11,611,732 B1
(45) Date of Patent: Mar. 21, 2023

(54) METHOD AND DEVICE FOR ALIGNING COLOR CHANNELS

(71) Applicant: CHRISTIE DIGITAL SYSTEMS USA, INC., Cypress, CA (US)

(72) Inventors: Andrew Dennison, Breslau (CA); Christopher John Gordon, Waterloo (CA); Simon Thomson, Kitchener (CA); Peter Anthony Van Eerd, Guelph (CA); Colin Bartlett Yardley, Waterloo (CA); Chad Faragher, Kitchener (CA)

(73) Assignee: CHRISTIE DIGITAL SYSTEMS USA, INC.

( * ) Notice: Subject to any disclaimer, the term of this patent is extended or adjusted under 35 U.S.C. 154(b) by 0 days.

(21) Appl. No.: 17/411,717

(22) Filed: Aug. 25, 2021

(51) Int. Cl.
*H04N 9/31* (2006.01)

(52) U.S. Cl.
CPC ......... *H04N 9/3194* (2013.01); *H04N 9/3155* (2013.01); *H04N 9/3182* (2013.01)

(58) Field of Classification Search
CPC .. G03B 21/142; G03B 21/147; G03B 21/208; G03B 21/2046; G03B 21/2053; H04N 9/317; H04N 9/797; H04N 9/3152; H04N 9/3155; H04N 9/3182; H04N 9/3185; H04N 9/3188; H04N 9/3191; H04N 9/3194
See application file for complete search history.

(56) References Cited

U.S. PATENT DOCUMENTS

| | | | |
|---|---|---|---|
| 7,262,816 B2 | 8/2007 | McDowall et al. | |
| 8,567,953 B2 | 10/2013 | O'Dor et al. | |
| 9,007,495 B1* | 4/2015 | Chin | H04N 17/002 348/246 |
| 10,080,004 B2 | 9/2018 | Grundhofer | |
| 2012/0013634 A1* | 1/2012 | Haraguchi | H04N 9/3194 345/589 |
| 2012/0188378 A1* | 7/2012 | Hsiao | G01N 21/274 382/218 |
| 2014/0292997 A1* | 10/2014 | Hung | H04N 7/141 348/189 |
| 2015/0035993 A1* | 2/2015 | James | H04N 17/04 348/189 |

* cited by examiner

*Primary Examiner* — Sultan Chowdhury
(74) *Attorney, Agent, or Firm* — Perry + Currier Inc.

(57) ABSTRACT

A method of aligning a plurality of color channels of a projector is provided. The method includes: for each color channel, (i) projecting test pattern on a surface; (ii) capturing image of the test pattern generated on the surface; and (iii) adding the captured image to an image set. Once the captured images for each color channel are added to an image set, identifying a reference position based on the image set. This is followed by processing the image set to estimate a divergence of the respective test patterns for each color channel with respect to the reference position, followed by computing a corrective function for each color channel and applying the respective corrective function to each color channel to align the color channel to the reference position.

13 Claims, 9 Drawing Sheets

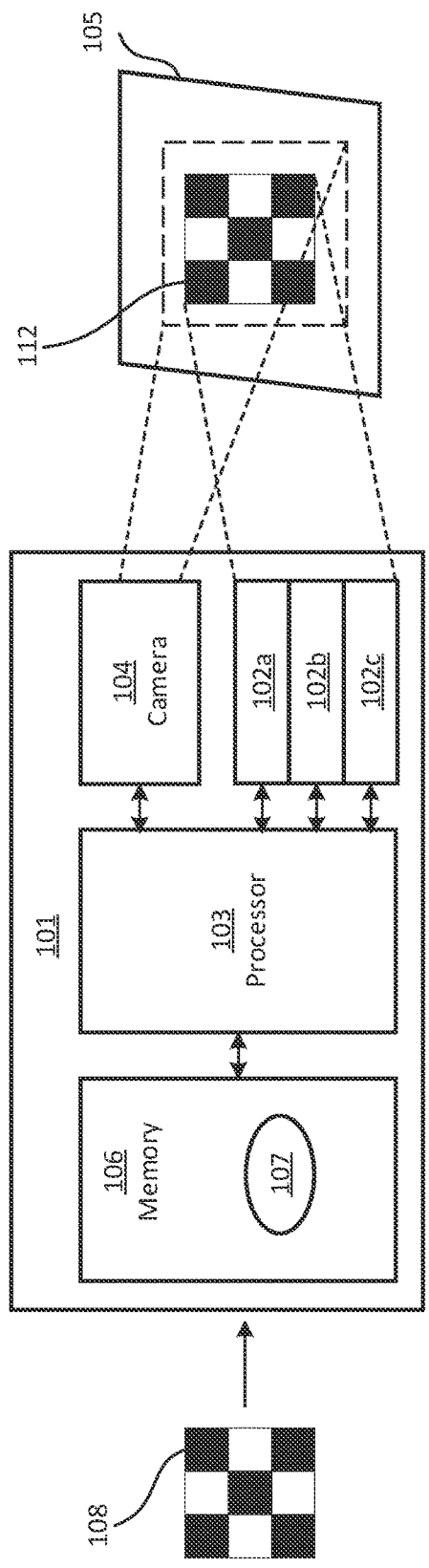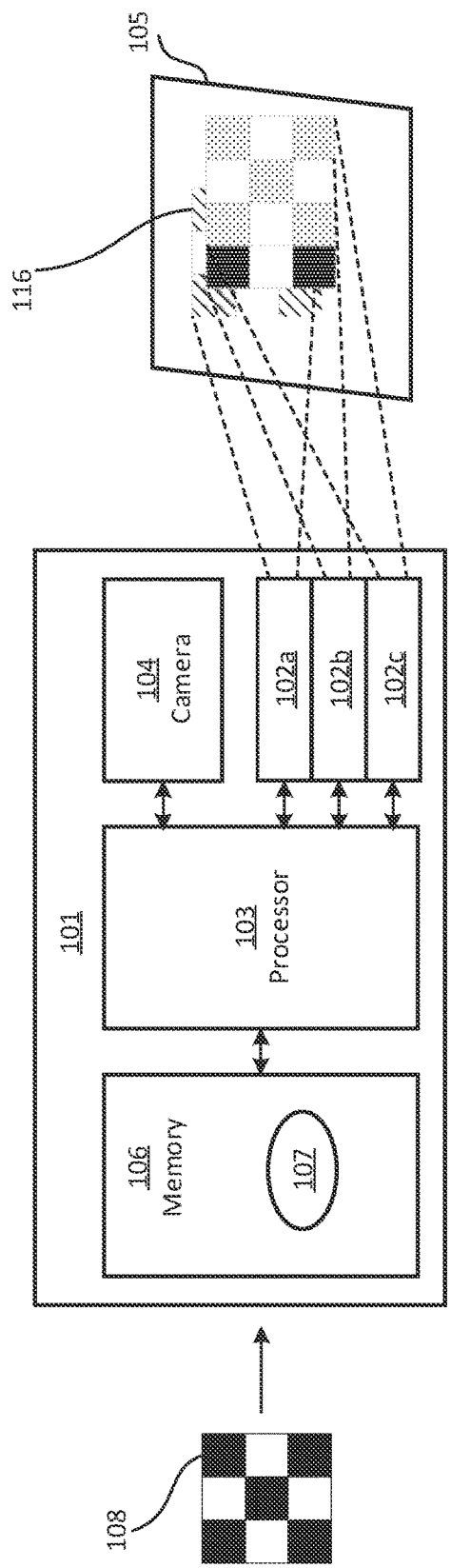

METHOD AND DEVICE FOR ALIGNING COLOR CHANNELS

FIELD

This invention relates to the field of projectors. More specifically, the invention relates to a method and a projector for automatically aligning color channels.

BACKGROUND

Projectors may project images having a full spectrum of color by overlaying multiple color channels on one another. Color convergence is a process of aligning component color channels of a projector so that each pixel falls on the same point on a display across all color channels. In a multi-channel projector, where there are separate channels for each primary color of light, it is important that the colors are aligned as closely as possible so that any given pixel has all its colors landing on the same point on a screen on which it displays. Even if the projector is manufactured in perfect alignment, vibrations and other forces can cause the channels to shift slightly over time, resulting in diverged colors. To keep the projector image sharp over the lifetime of the projector, the colors must be re-converged periodically. For example, when a white square is shown by an RGB projector, the Red, Green, and Blue channels need to be converged so that there are no color fringes visible around the edge of the square.

SUMMARY

According to an aspect of the disclosure, a method of aligning a plurality of color channels of a projector is provided. The method comprises performing the below steps (i), (ii) & (iii) for each color channel:
(i) projecting a test pattern on a surface; (ii) capturing an image of the test pattern generated on the surface; (iii) adding the captured image to an image set. Once the captured images for each color channel are added to an image set, identifying a reference position based on the image set. After the reference position is set, processing the image set, comprising the images for each color channel, to estimate a divergence of the respective test patterns for each color channel with respect to the reference position, followed by computing a corrective function for each color channel based on the estimated divergence from the reference position and applying the respective corrective function to each color channel to align the color channel to the reference position.

A projector configured to automatically align its color channels is also provided. The projector comprises a plurality of light sources, camera, and a processor. The light sources are configured to project a corresponding plurality of color channels. The camera is configured to capture images of the projected color channels. The processor is configured to: control the light sources to project a plurality of test patterns on a surface for at least two color channels; add the captured images of the projected color channels to an image set; identify a reference position based on the image set; process the image set to estimate divergence of the respective test patterns for each color channel with respect to the reference position; compute a corrective function for each color channel based on the estimated divergence from the reference position; and apply the respective corrective function to each color channel to align the color channel to the reference position.

A system to automatically align color channels of a projector is also provided. The system comprises a projector comprising a plurality of light sources configured to project a corresponding plurality of color channels; a camera configured to capture images of the projected color channels and a processor. The processor is configured to control the light sources to project a plurality of test patterns on a surface for at least two color channels; add the captured images of the projected color channels to an image set; identify a reference position based on the image set; process the image set to estimate divergence of the respective test patterns for each color channel with respect to the reference position; compute a corrective function for each color channel based on the estimated divergence from the reference position; and apply the respective corrective function to each color channel to align the color channel to the reference position.

BRIEF DESCRIPTIONS OF THE DRAWINGS

Embodiments are described with reference to the following figures.

FIGS. 1A & 1B are schematic diagrams of an example projector. FIG. 1A depicts a projector with aligned light sources. FIG. 1B depicts a projector with misaligned light sources.

Figure 6A:
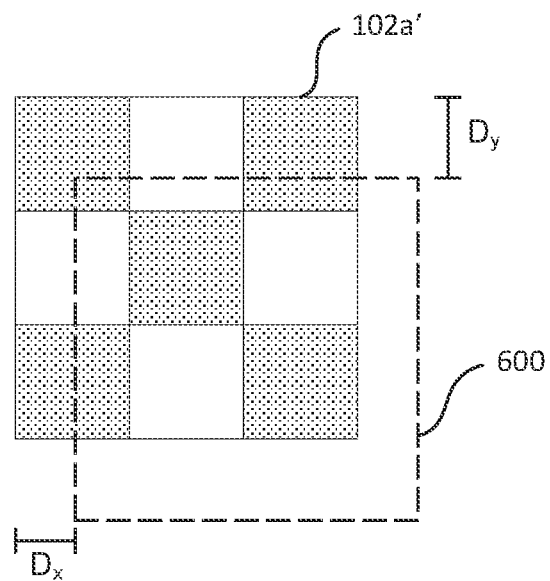
Figure 6B:
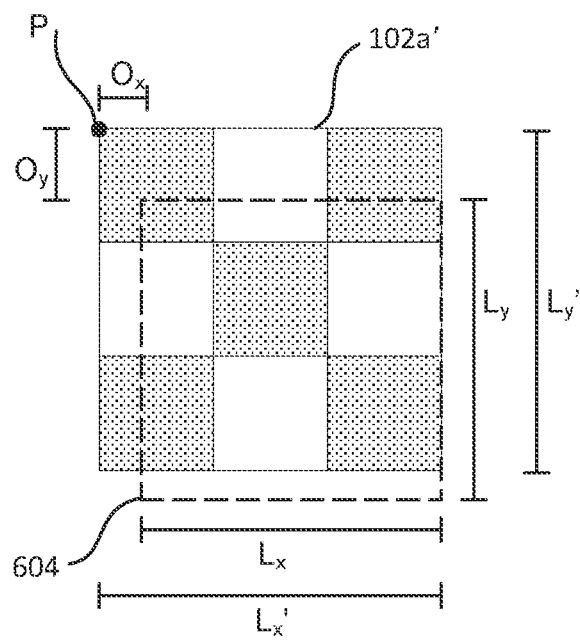

FIGS. 6A & 6B depict different examples of estimating divergence. FIG. 6A depicts an example projected pattern and reference position with equal sizes. FIG. 6B depicts an example projected pattern and reference position with different sizes.

Figure 7A:
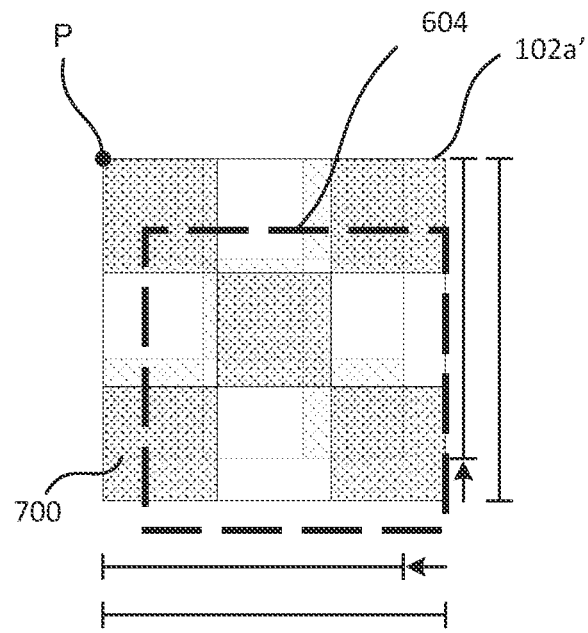
Figure 7B:
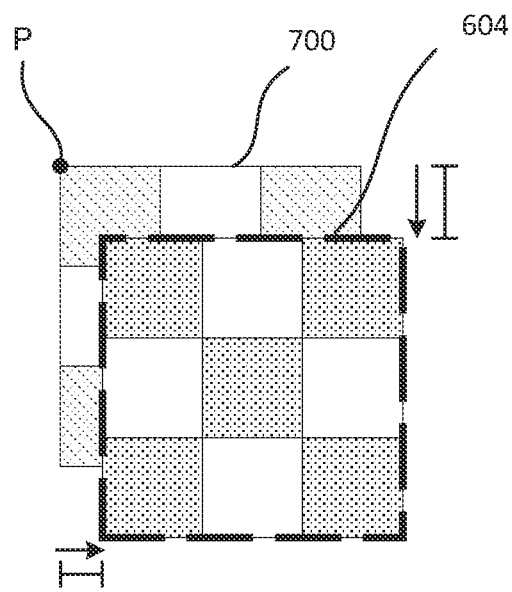

FIGS. 7A & 7B depict examples of applying corrective function to a color channel.

FIG. 7A depicts scaling of projected pattern to align it with reference position. FIG. 7B depicts shift in position of an intermediate pattern from original position to a new position overlapping with reference position.

Figure 8:
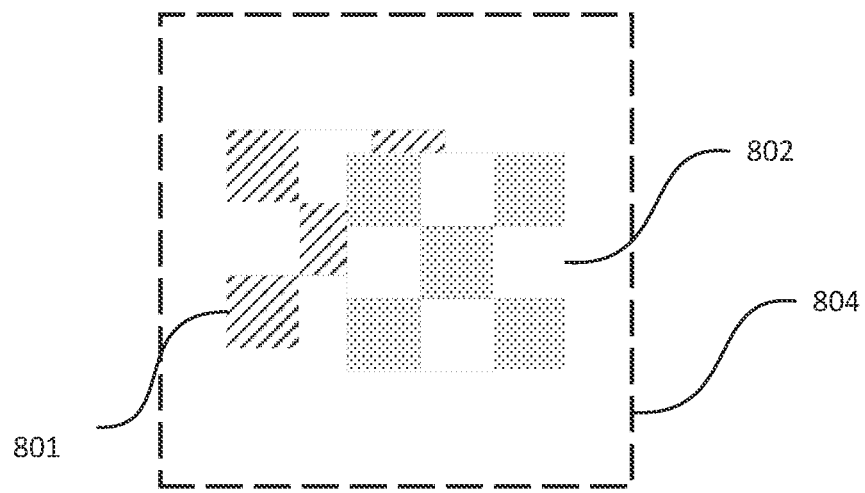

FIG. 8 depicts an example of projecting multiple test patterns for multiple color channels.

Figure 9:
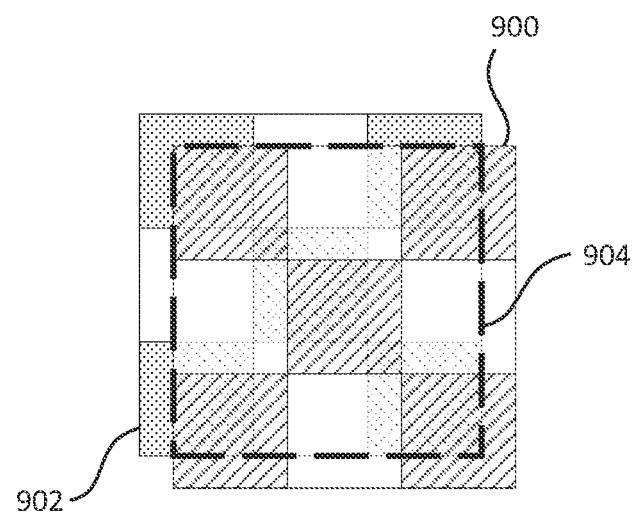

FIG. 9 depicts an example of choosing a reference position as an intersection of overlapping color channels.

Figure 10:
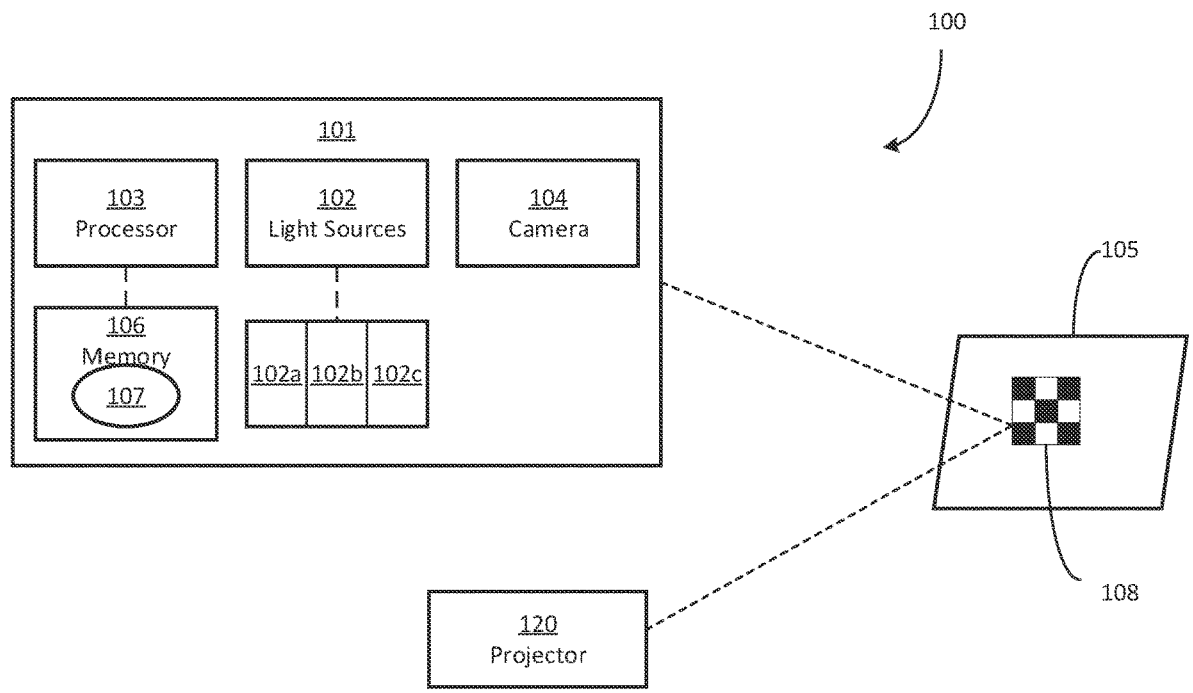

FIG. 10 is a block diagram of projector of FIG. 1A aligned with an external projector.

Figure 11:
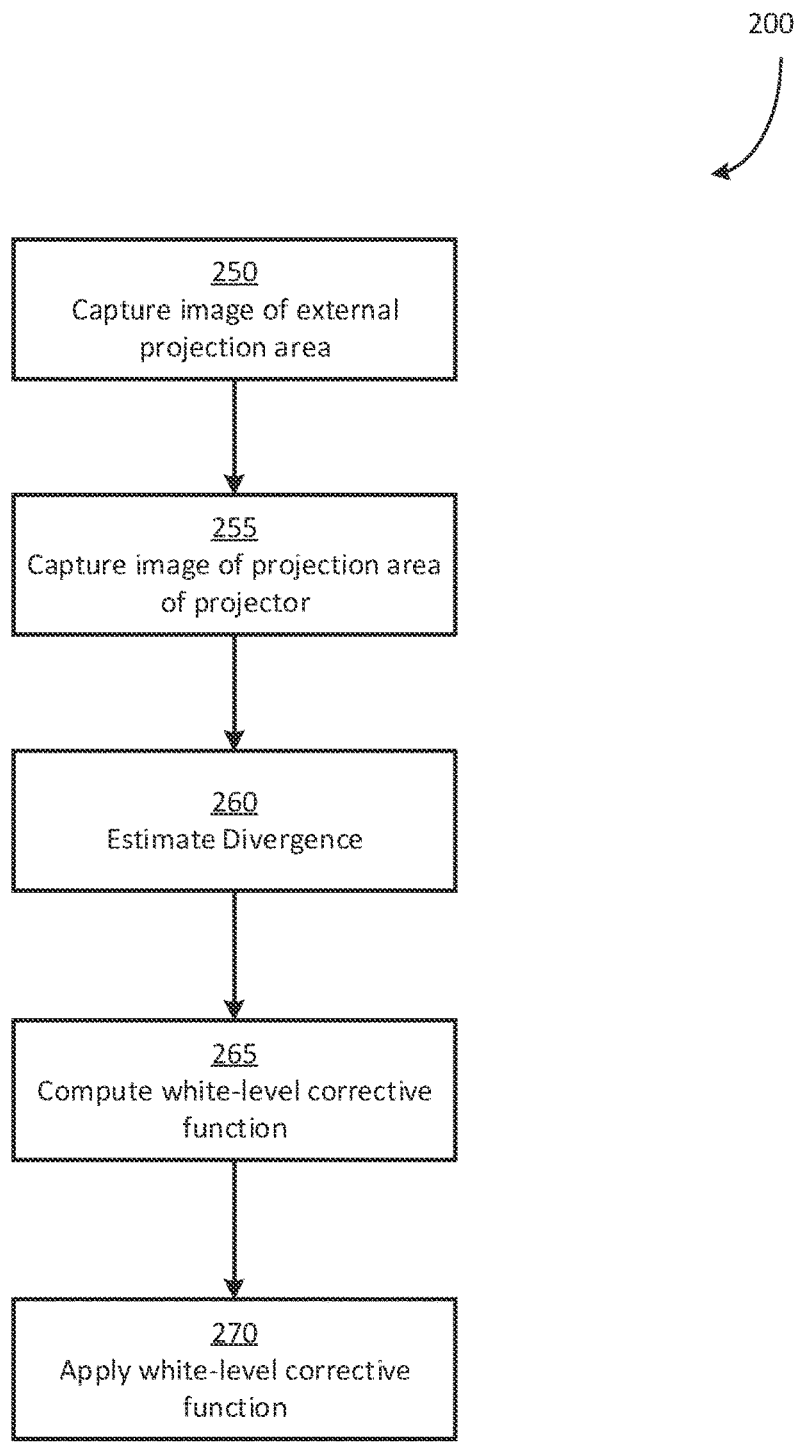

FIG. 11 is a flowchart of an example method of aligning projector of FIG. 1A with one or more external projectors.

DETAILED DESCRIPTION OF THE EMBODIMENTS

Color convergence of a multi-channel projector can be accomplished mechanically or electronically. Traditionally, color convergence is performed mechanically using adjustment mechanisms built into the projector. The mechanical method, however, requires access to the projector by a trained technician and takes time.

The present specification addresses these problems by providing a projector with an automatic color convergence capability which would allow more frequent and more accurate alignment of color channels and a method of aligning a plurality of color channels of the projector.

FIG. 1A depicts an example projector 101. The projector 101 is generally configured to project images, including still images, videos, and the like, onto a surface 105. The surface 105 may be a planar surface, such as a wall or screen, and may have a generally uniform color to allow optimal projection of the images onto the surface 105. In other examples, the surface 105 may be of other shapes and types for example, the surface 105 may be flat, non-planar, non-rectangular or may include one or more textures or surface variations, and/or colors.

Different components of the projector 101 will be described below. In particular, the projector 101 includes multiple light sources 102, each configured to generate a different color channel for a given image. Three example light sources 102a, 102b, 102c are depicted (referred to herein generically as a light source 102 and collectively as light sources 102). The light sources 102 may generally be configured to project light corresponding to the respective color channels for the projector 101, so the light sources 102 are capable of projecting across the entire projection area of the projector 101. The light sources 102 should also have pixel capabilities to adjust the light projected in a given pixel. One way of doing that is that the light source 102 could be a micro-display device. The micro-display device may be any device known in the art such as digital micro-mirror devices or transmissive liquid crystal micro-displays.

The projector 101 further includes a processor 103 configured to control light sources 102 to project images across different color channels. The processor 103 is further configured to control light sources 102 and a camera 104 for a color alignment operation (described later). The processor 103 may be for example a central-processing unit (CPU), a microcontroller, a microprocessor, a processing core, a field-programmable gate array (FPGA) or similar. The processor 103 may also include series of cooperating processors. In the present example, the processor 103 is integral to the projector 101. In other examples, the processor 103 may be located externally to the projector 101 e.g., a part of a laptop computer or other suitable computing devices. In this case, the processor 103 may communicate with the projector 101 via a computer network such as such as an intranet, a local-area network, a wide-area network, a virtual private network (VPN), a Wi-Fi network, the internet, and similar to control the light sources 102.

The processor 103 is interconnected with a non-transitory computer readable storage medium, such as a memory 106. The memory 106 may include a combination of volatile memory (e.g., random access memory or RAM) and non-volatile memory (e.g., read only memory or ROM, electrically erasable programmable read only memory or EEPROM, flash memory). The memory 106 stores an alignment application 107 including a plurality of computer-readable instructions executable by the processor 103. The memory 106 may also store additional data for the color alignment operation. The alignment application 107, when executed by the processor 103, configures the processor 103 to perform the color alignment operation discussed in greater detail later.

The memory 106 may additionally store a repository storing images of projected patterns captured by the camera 104 each time color channels are aligned. The repository may further store identifiers of the projected pattern (e.g., association with the color channels, time and date data, number of times the pattern is projected by the color channel, or the like). The memory 106 may further store an external alignment application to align projector 101 with one or more additional projectors. The memory 106 may also store divergence data and associated corrective function data for each color channel.

The processor 103 is also connected to the camera 104. The camera 104 is configured to capture images representing at least projection area of the projector 101 for color alignment operation. The camera 104 may be substantially any device capable of capturing images with sufficient quality so that captured images can be used to differentiate color channels. In some examples, more than one camera 104 may operate together to capture portions of the projection area of the projector 101. In the present example, the camera 104 is integral to the projector 101 and hence the location of the camera 104 may be at any point within the projector 101 which allows capturing images without obstruction and ensuring the at least a portion of projection area is captured. The ability of the projector 101 to integrate the camera 104 allows for an easy and efficient way of aligning color channels. For example, projection of patterns by the projector 101 and capturing images by the camera 104 can be easily synchronized through pre-set instructions and hence no manual intervention is required, field of view of the camera 104 can be conveniently aligned with the projection area of the projector 101, complicated installation mechanisms, compatibility issues for external cameras and the associated maintenance costs can be avoided. In other examples, the camera 104 may be located externally to the projector 101. In this case, the camera 104 may communicate with the projector 101 and the processor 103 via a computer network such as such as an intranet, a local-area network, a wide-area network, a virtual private network (VPN), a Wi-Fi network, the internet, and similar to capture images of at least a portion of the projection area.

In normal operation, the projector 101 receives an input image 108 from a connected computing device (not shown), the processor 103 splits the input image 108 based on the color components of the image to provide a color-coordinated input image (not shown) to each light source 102. The projector 101 may receive the input image 108 from the computing device through a wireless connection or a wired connection such as a USB cable or any other connecting mechanism.

Each light source 102 generates a different color channel for the projector 101. For example, the first light source 102a may produce red light to generate a red color channel for the projector 101. The second light source 102b may produce green light to generate a green color for the projector 101. The third light source 102c may produce blue light to generate a blue color channel for the projector 101. In this case, the processor 103 splits the input image 108 into RGB (red, green, blue) input images, and provides each of those to corresponding light sources 102a, 102b and 102c. That is, the processor 103 provides the red input image (i.e., corresponding to the red channel of the input image 108) to the first light source 102a, the green input image (i.e., corresponding to the green channel of the input image 108) to the second light source 102b, and the blue input image (i.e., corresponding to the blue channel of the input image 108) to the third light source 102c.

Each light source 102 projects its respective input image on the surface 105 to generate respective projected patterns. If the light sources 102 are aligned, the projected patterns in the respective color channels are overlaid over each other. This is depicted in FIG. 1A where the projected pattern 112 (containing projected patterns of the three light sources) is indistinguishable from the input image 108.

In other cases, when the light sources 102 are misaligned, their respective color channels are misaligned and, in such cases, the light sources generate an offset projected pattern 116 on surface 105 as depicted in FIG. 1B. The color channels of the projector 101 appear at different positions in the offset projected pattern 116. This misalignment of light sources 102 may occur over time in projectors causing the color channels to diverge and resulting in distortions in projected images.

In order to accurately project the input image 108, the processor 103 executes the color alignment operation to adjust the light sources to project color channels which overlap with each other. The color alignment operation involves using a specific test pattern to be provided as an input image to the projector 101. The test pattern is provided by the connected computing device. The test pattern may also be stored and retrieved from memory of the projector 101. The test pattern may be a structured light pattern (e.g., having grids or horizontal or vertical bars) to allow the projector 101 to readily detect the test pattern. The structured light pattern also allows the projector 101 to readily detect features of projected test pattern when projected onto the surface 105. In other examples, the test pattern may have any shape or pattern for example, the test pattern may be a square, circular, triangle, or the test pattern may depict an object or a scene.

Once the test pattern is provided to the projector, it is split into different test patterns for each of the light source 102. Each light source 102 then projects the respective test patterns in the color channels on the surface 105. The alignment operation then involves capturing images by the camera 104 of the projected test patterns generated by each light source 102. Once images of the projected patterns of the light sources have been captured, a reference position is defined to which the color channels are aligned. This alignment of color channels is done by first estimating divergence value of each projected test pattern with respect to the reference position. Once the divergence values are obtained, a corrective function for each color channel is computed. Each corrective function defines the overall transformation to be applied to the input image of the respective light source to align the respective color channel with the reference position. The corrective functions are then applied to each respective light source to align the color channels to the reference position and subsequently with each other. Once the corrective functions are applied to their respective light sources, the color channels appear converged on the surface 105 when projected.

Thus, the projector 101 is capable of automatically adjusting the color channels without the need of special tools or a trained technician to physically adjust the interior of the projector 101. This provides for more accurate adjustments and eliminates the need for maintenance of projectors from time to time. As the light sources are adjusted within the projector without the need to physically access the internal parts of the projector 101 or using external devices, the adjustment is performed more efficiently. The divergence data for each color channel can also be saved in the processor 103 and applied when needed.

Figure 2:
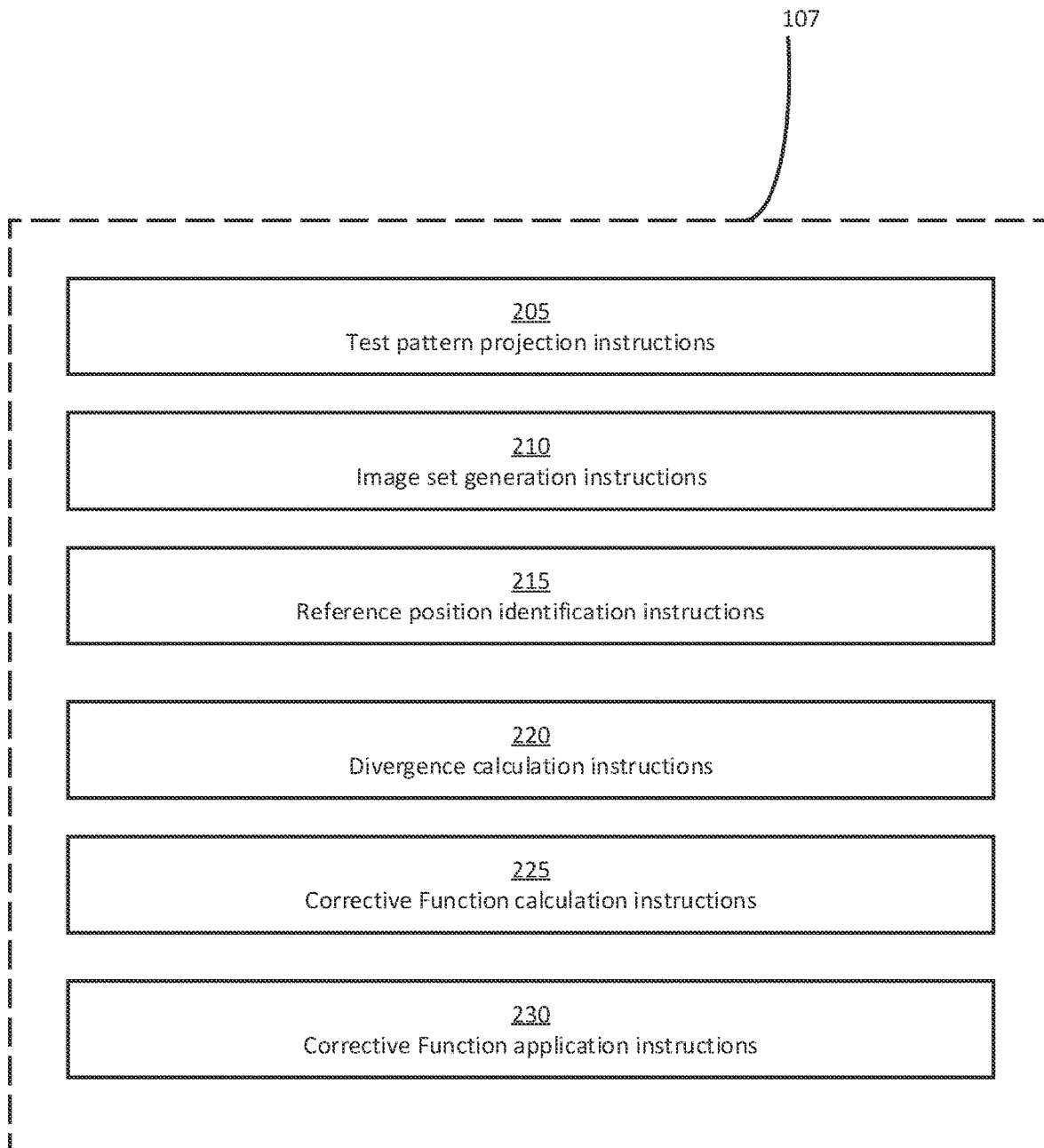
FIG. 2 is a block diagram of alignment application stored in a memory of the projector of FIG. 1A.

To conduct the color alignment operation, the processor 103 executes the alignment application 107 depicted in FIG. 2. In this example, the alignment application 107 is stored on the memory 106 in the projector 101 however, in other examples, the alignment application 107 may be stored on another storage medium accessible by the processor 103 for example, a memory of a laptop if the processor 103 is located inside the laptop to control the operation of the projector 101. The alignment application 107 includes test pattern projection instructions 205, image set generation instructions 210, reference position identification instructions 215, divergence calculation instructions 220, corrective function calculation instructions 225 and corrective function calculation instructions 230.

The test pattern projection instructions 205 when executed by the processor 103 configure the processor 103 to control the light sources 102 to project at least one input test pattern on the surface 105 for at least one of the color channels.

The image set generation instructions 210, when executed by the processor 103, configure the processor 103 to control the camera 104 to capture an image of at least one projected pattern for at least one of the color channels. The processor 103 generates an image set from the captured images. The image set is populated until images of each of the color channels have been captured.

The reference position identification instructions 215, when executed, configure the processor 103 to identify reference position based on the image set. The reference position is defined in a space common to the image set. The common space can be field of view of the camera 104 or projection space of the projector 101. There are different ways reference position can be identified and these are discussed in detail later.

The divergence calculation instructions 220, when executed, configure the processor 103 to process the image set and estimate divergence between the projected patterns for color channels and the reference position. The divergence estimated for each color channel represents spatial differences between the positions of the projected color channels and the reference position. The different ways that can be used to estimate divergence are discussed in detail later.

The corrective function calculation instructions 225, when executed, configure the processor 103 to compute corrective functions for color channels based on the divergence values and direction of divergence for each color channel. The corrective function represents the transformation needed for each light source 102 to project its respective color channel onto the reference position.

The corrective function application instructions 230, when executed, configure the processor 103 to apply the corrective functions to the light sources 102 for the respective color channel. The application of the corrective function may electronically warp the image and/or mechanically shift the light sources to align the color channels with the reference position.

Figure 3:
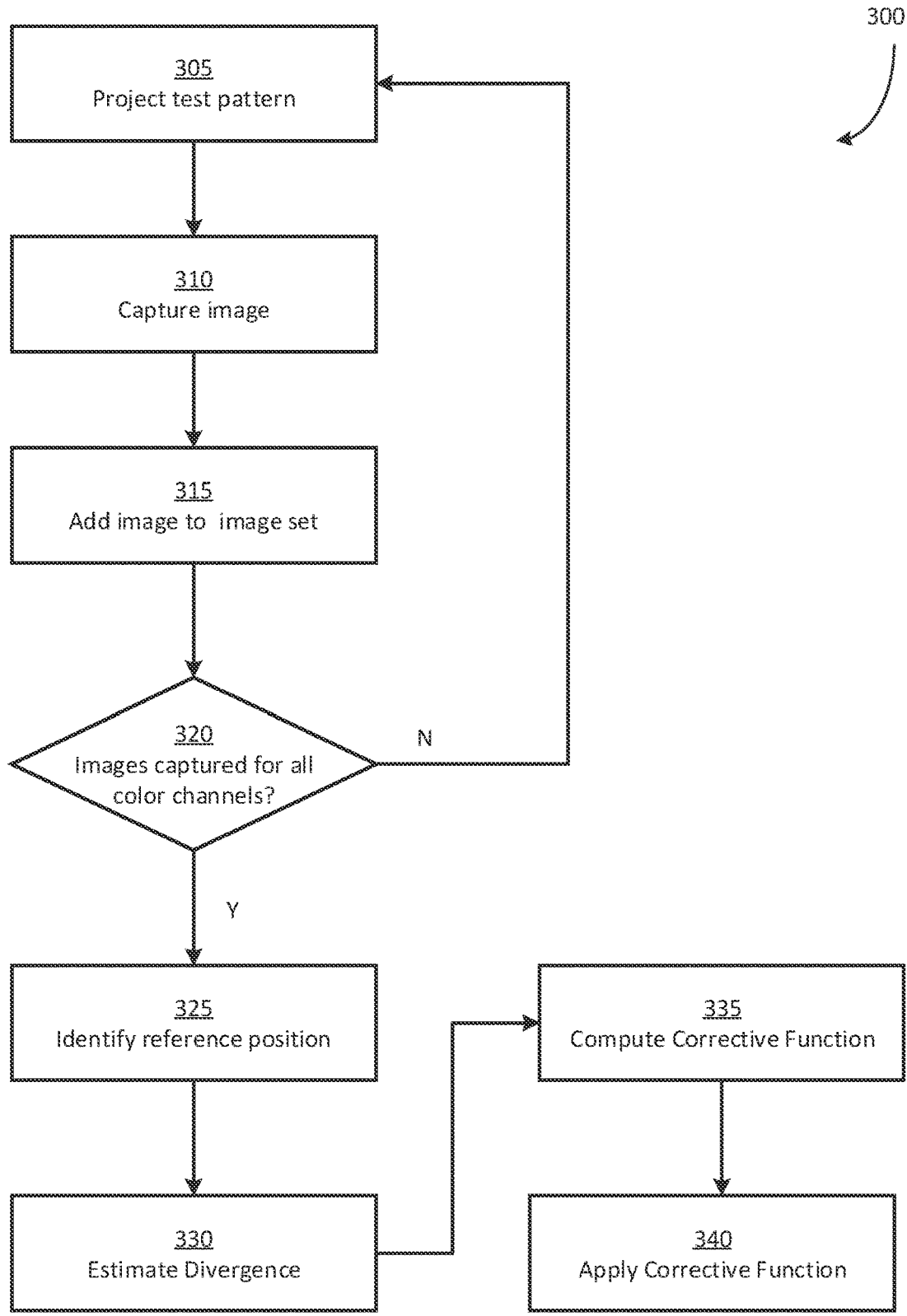
FIG. 3 is a flowchart of a method of aligning color channels of the projector of FIG. 1A.

Turning to FIG. 3, a flowchart of an example method 300 of aligning color channels of a projector is depicted which will be described, with reference to the components illustrated in FIG. 1A. In particular, the method 300 will be described in conjunction with its performance by the projector 101. In other examples, other suitable devices or systems, such as a laptop or any computing device comprising a processor to control the operation of the projector 101, may perform the method 300.

At block 305, the projector 101 projects a first test pattern on the surface 105 through a first light source 102a projecting in a first color channel. The first light source 102a may be chosen randomly from the available light sources 102a, 102b, 102c. The first light source 102a generates a projected test pattern 102a' as shown in FIG. 4.

Figure 4:
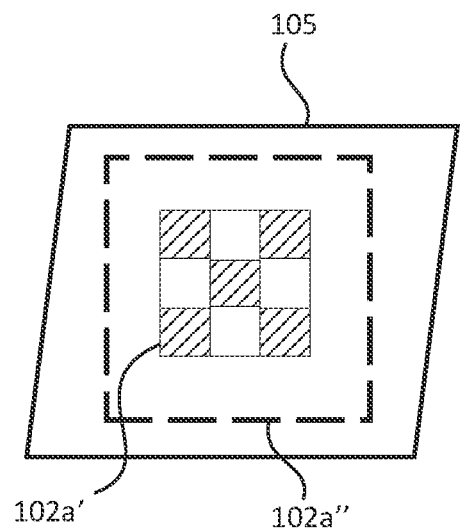
FIG. 4 depicts example projected pattern and captured pattern.

Returning to FIG. 3, at block 310, camera 104 captures an image 102a" of the projected test pattern 102a' as shown in FIG. 4.

At block 315, the processor 103 adds the captured image 102a" to an image set. When the camera 104 captures the image of projected test pattern, the processor 103 may identify which light source and color channel the captured image is associated with and may record this data as metadata to the image when it is added to the image set.

At block 320, based on captured images in the image set, the processor 103 verifies whether images for all light sources/color channels are captured. The processor 103 may use metadata stored for the captured images to verify if images for all light sources/color channels have been captured. If, at block 320, images for all color channels are not captured, the processor 103 returns to block 305 to continue capturing images representing the test patterns for further color channels.

Figure 5:
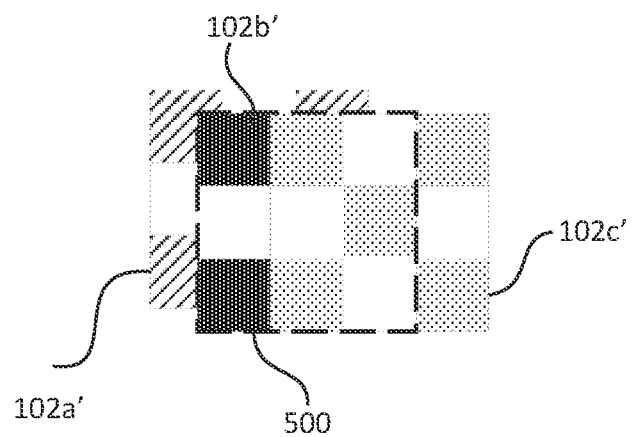
FIG. 5 depicts a color channel chosen as a reference position.

If, at block 320, images of all color channels are captured, the processor proceeds to block 325. At block 325, the processor 103 identifies a reference position. The reference position may represent a coordinate, set of coordinates, or area with which each color channel is to be aligned. In order to determine the reference position, the processor 103 may use the positions of the projected patterns. In other words, the reference position may be defined in the camera space (i.e., in the same space as the projected patterns). In addition to identifying the reference position, the processor may generate a mapping from the camera space to projector space based on the known calibration between the camera and the projector. The reference position may be identified in a variety of ways for example, the processor 103 may select one of the color channels to define the reference position. The reference position may therefore be defined as the projected position of the selected color channel as shown in FIG. 5. In this example, three misaligned light sources 102a, 102b, 102c are projected to generate projected patterns 102a', 102b' and 102c', respectively. The area covered by the projected image of the second color channel 102b' is chosen as a reference position 500.

The processor 103 may select a particular color channel as the reference position based on a predefined instruction defining a specific color to be chosen as a reference position every time the method 300 is executed. In some cases, the color channel to be selected as reference position may be chosen randomly or based on the color channel which is most central to the other color channels or other suitable selection methods.

At block 330, the processor 103 estimates a divergence of each color channel with respect to the reference position. In some examples, the color channels may be assumed to have the same area as one another and the reference position but are misaligned in the XY axis of the camera plane. For example, FIG. 6A shows the projected pattern 102a' of the color channel having the same area as a reference position 600. In this case, the divergence may simply include an offset in an X dimension and an offset in a Y dimension. In the present example, the offsets are represented, respectively, by $D_x$ and $D_y$ of the projected pattern 102a' for light source 102a with respect to the reference position 600. In particular, the $D_x$ and $D_y$ values may be calculated relative to the reference position 600 (i.e., using corresponding points of the reference position 600 as an origin such that offset in a first direction along either the X or Y dimension represents a positive offset and offset in the opposite direction represents a negative offset). The processor thus estimates values $D_x$ and $D_y$ for further processing to align the color channel with respect to the reference position.

In some cases, the color channels may have a different size as compared to the reference position. In such examples, the divergence between a projected pattern and the reference position may include a ratio between lengths of the projected pattern and the reference position in the X dimension, a ratio between the lengths of the projected pattern and the reference position in the Y dimension, as well an offset in the X dimension and an offset in the Y dimension. This is shown in FIG. 6B, the area of a reference position 604 is smaller than the area of the captured image of projected color channel 102a'. In this case, the processor 103 may select a point P on the color channel which is fixed when the projected color channel 102a' is scaled. The fixed-point P can be chosen arbitrarily as any of the corners of the test pattern, or it can be chosen as a center of the test pattern or any position within the area of the test pattern. The offset of the reference position with respect to the fixed-point P is estimated as $O_x$ and $O_y$ in the XY plane. In addition, dimensions in the XY plane for the projected pattern 102a' and the reference position 604 are determined. The dimensions of the reference position 604 are represented by $L_x$ and $L_y$. That is, $L_x$ represents the length or width of the reference position 604 in the X dimension, while $L_y$ represents the length or height of the reference position 604 in the Y dimension. Similarly, the dimensions of the projected color channel 102a' are represented by $L_x'$ and $L_y'$. That is, $L_x'$ represents the length or width of the projected color channel 102a' in the X dimension, while $L_y'$ represents the length or height of the projected color channel 102a' in the Y dimension.

The divergence may therefore include a ratio $L_x:L_x'$ (i.e., the ratio between the lengths of the reference position 604 and the projected pattern 102a' in the X dimension), a ratio $L_y:L_y'$ (i.e., the ratio between the lengths of the reference position 604 and the projected pattern 102a' in the Y dimension), as well as the offsets $O_x$ and $O_y$.

Returning again to FIG. 3, at block 335, the processor 103 computes a first corrective function for the first color channel 102a based on the divergence values of the first projected pattern relative to the reference position. Similarly, the processor computes a second corrective function for the second color channel 102b based on the divergence values of the second projected pattern relative to the reference pattern and a third corrective function for the third color channel 102c based on the divergence values of the third projected pattern relative to the reference pattern. Each corrective function defines one or more transformations (e.g., scaling, translations) to be applied for the corresponding light source 102. The transformations defined in the corrective function realigns each light source 102 to correct the divergence of their respective color channels with respect to the reference position. For example, if a color channel is misaligned and the area of the projected pattern is determined or assumed to be the same as the area of the reference position, the corrective function just shifts the projected pattern to the reference position. In other cases, when the area of the projected pattern and reference position are different, the corrective function scales the area of the color channel using the ratios defined in the divergence values to match the area of the reference position. Once the scaling is done, the corrective function moves the color channel to match the area of the reference position using the offsets defined in the divergence values.

Thus, to compute the corrective function, the processor 103 may first determine the corrections to be applied to each projected pattern to transform the projected pattern to the reference position (i.e., the corrections required in camera space). Once the processor 103 has determined the corrections required in camera space, the processor 103 may map the corrections from camera space to projector space based on a predefined and/or known relationship between camera space and projector space (e.g., as determined during color alignment operation, or as predefined based on a known arrangement of the camera and the light sources). The processor 103 may then define the corrective function as the corrections to be applied to a given light source (i.e., in projector space).

The processor 103 may store the corrective functions for each color channel in the memory 106. The processor 103 may also update the stored corrective functions each time the color channels are aligned.

At block 340, the processor 103 applies the corrective function for each color channel to the respective light source 102. There are different ways the processor 103 may apply the corrective function to the light sources. For example, the corrective function may be applied electronically. In this case, the processor 103 first warps, i.e., scales and translates the input image for a color channel according to the corrective function and provides warped input image to the corresponding light source. In other words, after the input image is separated into its color components and each component input image is provided to its respective light source 102, the component image is warped based on the corrective function determined for the given light source 102. The corrective function application is depicted in FIGS. 7A and 7B.

Notably, application of the corrective function is performed on the input images to the light source in order to electronically warp the input image. The warps applied to the input image directly affects the projected pattern in the same manner, and hence the application of transformations is described below as being performed on the projected pattern. However, it will be understood, that the corrective function is applied to the input images (i.e., via a predefined or known correspondence or mapping between the camera space and the projector space) in order to affect the same changes in the projected pattern.

FIG. 7A shows scaling of the projected pattern 102a' of a color channel by the processor 103 to align it with respect to the size of the reference position 604. Since the projected pattern 102a' and reference position 604 do not match in size, the processor 103 causes the projected pattern 102a' to modify its size to align it with the reference position. In particular, the processor 103 may apply the ratio $L_x:L_x'$ to the length $L_x'$ of the projected pattern 102a' in the X dimension (i.e., the width) to scale the width of the projected pattern 102a' to match the width $L_x$ of the reference position 604. Similarly, the processor 103 may apply the ratio $L_y:L_y'$ to the length $L_y'$ of the projected pattern 102a' in the Y dimension (i.e., the height) to scale the height of the projected pattern 102a' to match the height $L_y$ of the reference position 604. Further, to allow the offset values to remain accurate, the point P remains fixed and does not change when the projected pattern 102a' is scaled. After applying the ratios $L_x:L_x'$ and $L_y:L_y'$ to scale the width and height of the projected pattern 102a', an intermediate pattern 700 is generated. In particular, the intermediate pattern 700 has the same area as the reference position 604. The intermediate pattern 700 represents an intermediate form of the projected pattern 102a' used for computation and/or application of the corrective function and may not be projected by the projector 101.

FIG. 7B shows shift in position of the intermediate pattern 700 from original position to a new position overlapping with the reference position 604. The processor 205 shifts the projected pattern 700 based on the corrective function value in both X and Y directions to align it with the reference position 604. In other words, the processor 103 shifts the intermediate pattern 700 by the offset $O_x$ in the X dimension in the opposite direction of the offset $O_x$. That is, if the offset $O_x$ is positive (i.e., shifted up relative to the reference position 604), the processor 103 shifts the intermediate pattern 700 in the negative direction (i.e., down). Similarly, the processor 103 shifts the intermediate pattern 700 by the offset $O_y$ in the Y dimension in the opposite direction of the offset $O_y$. As noted above, since the point P remains fixed through scaling, the offsets $O_x$ and $O_y$ remain the same for the projected pattern 102a' and the intermediate pattern 700, and hence applying the translations of the corrective function to the intermediate pattern 700 achieves the result of shifting the intermediate pattern 700 to the reference position 604.

The application of corrective function can also be achieved in other ways. In some examples, the corrective function can be applied mechanically. In this case, a plurality of motors may be used for the application of corrective function in the form of XY translations on the light sources 102. The motors cannot scale the images as explained above in the electronic alignment method; hence, the motors are configured to receive input signals from the processor 103 to physically adjust the position of light sources 102. The processor 103 may use metadata stored at the memory 106 to generate input signals to be provided to the motors. The input signals may include light source identifier along with the corrective function value associated with the light source 102. The motors may include horizontal alignment motors for aligning color channel in the X direction and vertical alignment motors for aligning color channel in the Y direction based on the corrective function values. The processor 103 may be further configured to control the operation of horizontal alignment motors and vertical alignment motors. The motors used herein can be mounted on the light sources 102. The motors may include, but are not limited to, piezo actuators or high precision stepper motors or any other motors known in the art suitable for alignment applications.

In some examples, the corrective function can be applied using a combination of electronic and mechanical means. In this case, the processor 103 may scale the input image to the light source 102 electronically and may mechanically shift the light sources using the motors.

Once the corrective function is applied for one color channel, the subsequent color channels are then aligned in a similar way using the different ways described above. After applying the corrective functions, the color channels will be aligned, thus the method 300 allows projector 101 to align color channels 102 automatically.

As described above, the transformations are computed and applied to the color channels based on the captured image of the projected color channel. In some examples, the captured image(s) of the projected color channel may include a portion or region of the projection area, based on the field of view of the camera. In such examples, the transformation may be computed based on the divergence detected in the captured portion and applied to the remainder of the color channel. In still further examples, the transformations may computed and applied per pixel or per region, rather than computing a single transformation for the entire color channel.

The method 300 describes projecting one test pattern for a color channel at a time. However, other ways of projecting test patterns are contemplated. For example, multiple test patterns for different color channels can be projected at a time as shown in FIG. 8. In this case, two misaligned color channels are projected simultaneously generating projected patterns 801 and 802. The camera 104 captures a single image 804 of the projected patterns 801 and 802 and the processor 103 then adds the image 804 to the image set. The processor 103 may be configured to identify projection positions for each color channel in the image 804 containing multiple color channels. The processor 103 may perform image analysis to detect each projected pattern and associate the position of each projected pattern to the correct color channel based on simple color coordination. That is, the processor 103 may determine that the projected pattern 801 is green and associate the projected pattern 801 and its position with the second (i.e., green) light source 102*b*. The processor 103 may then use said position for performance of the blocks 325 to 335 of the method 300 to align the green color channel with the reference position.

In some examples, in particular when multiple test patterns are projected simultaneously, rather than detecting the entire projected pattern, the processor 103 may detect a portion of the pattern. For example, when the test pattern comprises a regular array or arrangement of shapes (e.g., squares or rectangles), the processor 103 may simply detect a given one of the shapes (e.g., one closest to a top left corner), and proceed with defining a reference position, estimating divergence, and computing a corrective function based on the given shape. In particular, detection of a given portion of the projected pattern may be performed when the differences in location of the color channels are assumed to be small. Under such an assumption, the features of the test pattern may be localized to within a small radius of the same feature of a different color channel. Accordingly, the processor 103 may apply a detection algorithm to locate the selected feature or portion of the projected pattern on one color channel. Subsequently, the processor 103 may detect the corresponding feature on the other color channels by searching within a small predefined radius, using independently displayed color channels, or simultaneously displayed color channels.

In some examples, multiple test patterns for same color channel can be projected in sequence for a more accurate determination of position of the projected color channel. The images of the projected patterns for the same color channel are added to the image set along with the images of the projected patterns for other color channels. There are different ways, the processor 103 may use images of multiple projected patterns for the same color channel. For example, the processor 103 may use the images to get a more precise position (e.g., using the average position it detects based on the images) and estimate a divergence value based on the more precise position. In other examples, the processor 103 may calculate an average of the divergence values of the same color channel and compute the corrective function based on the average divergence value for the specific color channel. Alternatively, the processor 103 may select an image with better clarity or combine multiple images each depicting either the X coordinates more precisely or Y coordinates more precisely or both to estimate divergence for the color channel more accurately.

Additionally, the processor may employ alternate manners of selecting a reference position to which the color channels are aligned. The processor 103 may chose reference position as any position to which the color channels can be aligned. It may be defined in terms of area or a specific point in the projection plane. In the above examples, reference position is chosen as one of the color channels. Other ways of defining a reference position may be for example, as an area defining overlap of projected color channels. This is depicted in FIG. 9 where projection of two color channels 900 and 902 is depicted. In this case, the processor 103 may be configured to identify the overlapping portions or intersection of the two color channel projection patterns 900 and 902. The overlapping portion is represented by the area inside the dashed line and this intersection of the two overlapping color channel projections is set as the reference position 904.

In other examples, the reference position may be calculated using an average of the projected color channels. The average may be calculated for example by obtaining coordinates of two opposing corners of the projected test patterns for each color channel, calculating an average coordinate of each of corner (e.g., the average top left corner and the average bottom right corner) and setting it as a reference position. In other examples, the processor 103 may be configured to obtain coordinates of centroid of the projected test patterns for each color channel and based on the data obtained for all projected patterns, calculate an average of the same and set it as the centroid of a reference position.

Turning to FIG. 10, a block diagram of a system 100 containing two projectors is depicted. The projector 101 is paired with an external projector 120 which similarly projects images, including still images, videos, and the like herein generically referred to as pattern 108 at a surface 105. The projector 120 is similar to the projector 101 and may contain similar components as described in FIG. 1A, including one or more light sources and a controller to control the projection of images from the projector 120. In some examples, the system 100 may include more than one external projector 120. The projector 101 and the one or more external projectors 120 may be configured to project images in alignment with one another. In some examples, the pairing and alignment of the projector 101 with the external projector 120 may include superimposing the projection areas of the projector 101 and the external projector 120, for example to obtain an image having greater color saturation. In other words, the projection areas of projector 101 and projector 120 may be configured to overlap with one another. Alternatively, the pairing and alignment of the projector 101 and the external projector 120 may be include aligning the projection areas of the projector 101 and the external projector 120 adjacent to one another (e.g., side by side), for example to project a composite image using the system 100. Accordingly, the projector 101, and in particular the external alignment application, may apply a white-level transformation to appropriately align the projection area of the projector 101 with the projection area of the projector 120.

An example method 200 of external alignment is depicted in FIG. 11. At block 250, the external projector 120 projects a test pattern representative of the full projection area of the external projector 120 (e.g., at least indicating two opposing corners, edges, or actively projecting over the full area) and the processor 103 controls the camera 104 to obtain an image of projection area of the external projector 120. In some examples, the camera 104 may capture a single image of the projection area. Alternatively, the camera 104 may capture multiple images of the projection area of the external projector 120.

At block 255, the processor 103 is configured to control the camera 104 to capture the projection area of the projector 101. This can be done in different ways. For example, the projector 101 may project another test pattern representative of the full projection area of the projector 101 and capture an image of said test pattern using the camera 104. In other examples, the camera 104 may capture the projection area of the projector 101 simultaneously with capturing of the projection area of the external projector 120 during block 250. Alternatively, the processor 205 may determine the projection area during performance of the color channel alignment method 300 or retrieve the image of the projection area of the projector 101 from memory 106 based on previous performance of color channel alignment method 400.

At block 260, the processor 103 is configured to determine divergence of projection area of external projector 120 with respect to the divergence of the projection area of projector 101. For example, the projection area of the external projector may be defined as the reference position, and the processor 103 may determine a divergence between the projection area of the projector 101 and the projection area of the projector 120 (i.e., between the projection area of the projector 101 and the reference position) in a similar manner as performed at block 330. That is, processor 103 may calculate offsets between a selected fixed point of the projection area of projector 101 and a corresponding fixed point of the projection area of the external projector 120 in each of the X dimension and the Y dimension. The processor 103 may similarly calculate ratios between the lengths (i.e., widths and heights) of the projection areas in the X dimension and the Y dimension.

In other examples, such as when the projection areas are to be aligned adjacent to one another, the corner(s) of the projection area of the external projector 120 which are adjacent to the projection area of the projector 101 may be used as reference positions. The processor 103 may therefore compute the divergence from appropriate corners of the projection area of the projector 101 to said corners of the projection area of the external projector 120.

At block 265, the processor 103 determines a white-level corrective function based on the divergence values. The processor 103 may compute the white-level corrective function in a similar manner as performed at block 335 of the method 300. Since, the white projection the projector 101 is the combination of projections each of its individual color channels, only a single correction is computed. The white-level corrective function may therefore be applied to each of the color channels, resulting in an overall transformation of the projection area. The white-level corrective function defines an overall transformation to align the projection area of the projector 101 with the projection area of the external projector 120.

At block 270, the processor 103 is configured to apply the white-level corrective function. This is applied in addition to the color-channel specific corrective function applied for aligning the color channels of projector 101 with each other (as described in FIGS. 7A-7B). The white-level corrective function application and color-channel corrective function application can be performed sequentially for each color channel. Thus, for each color channel, the color-channel corrective function is applied first according to method 300 followed by white-level corrective function as described above. The application of the color-channel corrective function allows the color channels to be aligned with one another, i.e., an internal alignment. The application of the white-level corrective function allows the white-level projection (i.e., the combination of the color channels) of projector 101 to be aligned with the external projector 120, i.e., an external alignment, without hindering the internal alignment of color channels of the projector 101.

This method 200 is advantageous over methods where each color channel of one projector is mapped with each color channel of other projector for white-level alignment. This present method eliminates the need to re-compute color-specific corrective functions for each color channel. The white-level corrective function is applied on top of pre-stored/already applied corrective function for each color channel. This saves time and provides for a more accurate alignment.

The scope of the claims should not be limited by the embodiments set forth in the above examples but should be given the broadest interpretation consistent with the description as a whole.

The invention claimed is:

1. A method of aligning a plurality of color channels of a projector comprising:
for each color channel:
(i) projecting a test pattern on a surface;
(ii) capturing an image of the test pattern generated on the surface;
(iii) adding the captured image to an image set;
identifying a reference position based on the image set;
processing the image set, comprising the images for all of the color channels, to estimate a divergence of the respective test patterns for each color channel with respect to the reference position;
computing a corrective function for each color channel based on the estimated divergence from the reference position;
applying the respective corrective function to a respective one of a plurality of microdisplay devices corresponding to each color channel to align the color channel to the reference position.

2. The method as claimed in claim 1, wherein projecting the test pattern on the surface comprises projecting test patterns for at least two color channels simultaneously and wherein the image set comprises at least one single image of the test patterns simultaneously projected by the at least two color channels.

3. The method as claimed in claim 1, wherein applying the corrective function to the respective microdisplay devices comprises electronically controlling the microdisplay device to warp the color channel according to the corrective function.

4. The method as claimed in claim 1, wherein applying the corrective function to the respective microdisplay devices comprises electronically controlling at least one motor coupled to the respective microdisplay devices to align a position of the respective microdisplay devices according to the corrective function.

5. The method as claimed in claim 1, wherein identifying the reference position comprises selecting the reference position from the plurality of color channels of the projector.

6. The method as claimed in claim 1, wherein identifying the reference position comprises defining the reference position as an average of respective projection positions of the color channels.

7. The method as claimed in claim 1, wherein identifying the reference position comprises defining the reference position as an intersection of respective projection positions of the color channels.

8. The method as claimed in claim 1, further comprising pairing the projector with one or more external projectors and applying an external corrective function based on a white level projection difference of the projector with respect to the one or more external projectors.

9. A projector comprising:
a plurality of microdisplay devices configured to project a corresponding plurality of color channels;

a camera configured to capture images of the projected color channels;
a processor configured to:
- control the microdisplay devices to project a plurality of test patterns on a surface for at least two color channels;
- add the captured images of the projected color channels to an image set;
- identify a reference position based on the image set;
- process the image set to estimate divergence of the respective test patterns for each color channel with respect to the reference position;
- compute a corrective function for each color channel based on the estimated divergence from the reference position;
- apply the respective corrective function to each microdisplay device to align the respective color channel to the reference position.

10. The projector as claimed in claim 9, further comprising at least one motor coupled to the respective microdisplay devices wherein the processor controls the motor to align the respective microdisplay devices according to the corrective function.

11. The projector as claimed in claim 9, wherein the processor is configured to control the respective microdisplay devices to warp the color channels according to the corrective function.

12. The projector as claimed in claim 9, wherein the processor is configured to save the respective corrective functions of color channels.

13. A system comprising:
a projector comprising a plurality of microdisplay devices configured to project a corresponding plurality of color channels;
a camera configured to capture images of the projected color channels;
a processor configured to:
- control the microdisplay devices to project a plurality of test patterns on a surface for at least two color channels;
- add the captured images of the projected color channels to an image set;
- identify a reference position based on the image set;
- process the image set to estimate divergence of the respective test patterns for each color channel with respect to the reference position;
- compute a corrective function for each color channel based on the estimated divergence from the reference position;
- apply the respective corrective function to a respective one of the microdisplay devices corresponding to each color channel to align the color channel to the reference position.

* * * * *